United States Patent Office 3,660,368
Patented May 2, 1972

3,660,368
HIGH POLYCHLOROPRENES
Chester Arthur Hargreaves II, Wilmington, Del., assignor to E. I. du Pont de Nemours and Company, Wilmington, Del.
No Drawing. Filed June 27, 1967, Ser. No. 649,090
Int. Cl. C08f 1/10, 3/20; C08d 3/14
U.S. Cl. 260—92.3
5 Claims

ABSTRACT OF THE DISCLOSURE

Polychloroprenes which melt at temperatures of 80° C. and above. At least 95% of the chloroprene units of the polymer chain are trans-2-chloro-2-buten-1,4-ylene units and at least 95% of all 2-chloro-2-buten-1,4-ylene units in the polymer are in the head-to-tail sequence. The polychloroprenes are prepared by irradiating crystalline chloroprene at temperatures below —130° C.

BACKGROUND OF THE INVENTION

Chloroprene polymers of varying types and properties are well known in the art. The differences in these polymers are largely attributable to various types of isomerism which can occur in the polymer as follows:

(1) Structural isomerism which pertains to the carbon atoms in the 2-chloro-1,3-butadiene (chloroprene) monomer units which are incorporated into the polymer chain; for example there can be 1,2-, 3,4- and 1,4-isomerism in the polychloroprene chain. 1,4 - isomers are represented by the structural formula:

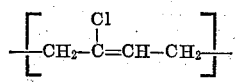

(2) Geometric isomerism which pertains to the configuration of atoms around the residual unsaturation in the recurring 1,4-units. There can be cis isomerism as represented by the following structure showing two units:

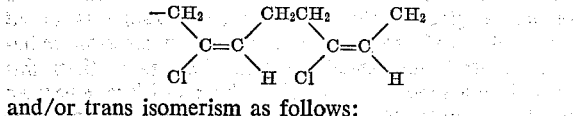

and/or trans isomerism as follows:

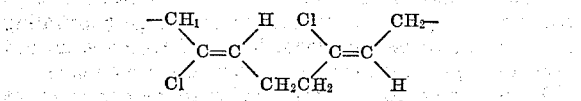

(3) Sequential isomerism which pertains to the point of attachment of the individual 1,4-monomer units to adjacent 1,4-units in the polymer. The above formulae illustrate head-to-tail isomerism in which the number 1 carbon atom of a chloroprene monomer is attached to the number 4 carbon atom of an adjacent monomer. One skilled in the art will readily appreciate that head-to-head and tail-to-tail isomerism can also occur in polychloroprene containing 1,4-structural isomerism in the polymer chain.

Considerable work has been done to elucidate the structure and determine the physical properties of polychloroprenes which have heretofore been prepared. See for instance Flory, Principles of Polymer Chemistry, 1953, p. 244 and Maynard and Mochel, Journal of Polymer Science 13, 251–62 (1954). These workers recognized that the greater the structural regularity of a polychloroprene, the higher would be its melting point. Structural regularity means there is a minimum of different types of isomerism present in the polymer chain. For instance all trans 1,4-chloroprene units arranged in head-to-tail sequence would constitute a structurally regular polychloroprene.

On page 573 of Flory's volume mentioned above, the author theorizes that the melting point of pure trans 1,4-polychloroprene would be 80° C. This value was obtained "by extrapolating to pure trans polymer."

In the work of Maynard and Mochel, studies were made of chloroprene polymers prepared by free-radical-initiated polymerization in aqueous emulsion at temperatures ranging from —40° C. to 100° C. From this work it was concluded that 1,4-polymerization accounts for the greater part of the structure of the polymer. They reported that the content of 1,4-units in the prepolymer ranges from 99% in polymers made at —40° C. to about 84% in polymers made at 100° C. Of the 1,4-units, only a small fraction had the cis configuration.

The possibility of sequential isomerism was recognized by Maynard and Mochel, but no quantitative study of this type of isomerism was reported by them.

Maynard and Mochel further report on the basis of work done on polychloroprene prepared at —40° C. that slower heating rates during a melting point determination and higher crystallization temperatures each result in higher observed melting temperatures, which approach a limiting value corresponding to thermodynamic equilibrium. The highest melting temperature which these workers observed was 73° C. on a polychloroprene sample prepared at —40° C. which was allowed to crystallize in a filled dilatometer at 60° C. [Maynard and Mochel, J. Pol. Sci. 13, 235–240 (1954)]. This polymer was found by infrared analyses to contain a total of 99% 1,4-units, of which 94% were in the trans configuration [J. Poly Sci. 13, 260 (1954)]. No analyses were made for head-to-tail, isomerism.

Prior to the present invention therefore, a polychloroprene possessing sufficient structural regularity to melt at temperatures as high as 80° C. or above has not been reported.

SUMMARY

According to this invention a chloroprene polymer melting at about 80° C. or above is prepared by subjecting crystalline chloroprene monomer to high energy radiation.

DETAILED DESCRIPTION

Melting temperatures referred to in the "Summary" and hereinafter are obtained by differential thermal analysis (DTA) as described in Slade and Jenkins, eds., Techniques and Methods of Polymer Evaluation, vol. 1, Thermal Analysis, chapter 2 by D. J. David, "Transition Temperatures by Differential Thermal Analysis," Marcel Dekker, Inc., 1966. This method gives observed melting points on the same sample somewhat below those obtained thermodynamically or dilatometrically as described above in the Maynard and Mochel references. Also, the melting point determination referred to, unless otherwise indicated, are performed on polychloroprene crystals prepared by irradiation of the crystalline monomer, which polychloroprene has not been subsequently recrystallized in some manner.

Experimental evidence indicates that the polychloroprenes of this invention are composed of monomeric chloroprene units of which about 95–100% are trans-2-chloro-2-buten-1,4-ylene units,

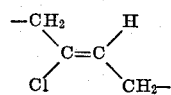

and that at least 95% of all 2-chloro-2-buten-1,4-ylene units in the polymer are in the head to tail sequence. The remaining portion of the polychloroprene is composed of monomer units in the various isomeric forms as described hereinabove.

The chloroprene polymers of the invention, unlike the elastomeric chloroprene polymers heretofore prepared, are white, fibrous, highly crystalline polymers having an appearance when first prepared somewhat similar to asbestos. Before initial melting, the fibers are very strong along the direction of their axes, but the fibers are easily separated, and the material tends to crumble when strained along the other two axes. The polymers are not elastomeric in nature. After these polymers have once been heated above their melting temperature, they lose the anisotropy described above. Thus they can be processed above their melting temperatures in conventional hydraulic presses, such as a Carver press, to form relatively strong films, or they can be molded to form solid articles such as those presently made from conventional thermoplastic polymers.

The initial melting points obtained from different samples range from about 80° C. upward. When molten polymer is allowed to recrystallize in bulk on cooling from the melting point to room temperature over a period of a few minutes to a few hours, a subsequent melting point of about 5–10° C. lower is obtained on reheating, possibly because a different crystalline structure is formed or reflecting the dependence of melting points of polymers on the conditions under which the crystallities are formed.

The glass transition temperature of the polymers of this invention, measured by differential thermal analysis is about —47° C. ±4° C.

The novel polychloroprenes of this invention form strong films and can be used for any of the applications in which film-forming crystalline polymers are used. Examples of such uses are in coatings and adhesives. The polymers are outstanding in their resistance to discoloration on aging.

The polymers of this invention can be prepared by subjecting crystalline chloroprene monomer to high energy radiation. Since the melting point of chloroprene is about —130° C., the irradiation treatment is carried out at temperatures below about —130° C.

In practicing the process of this invention, it is important that the monomer be in the crystalline state in order to yield the novel polymer of this invention. The practical temperature range for effecting crystallization of the monomer is —130° C. to —180° C. The higher temperature, —130° C., is the freezing point of the chloroprene monomer and the temperature —180° C. is the glass temperature of chloroprene monomer. Below the temperature of —180° C. crystallization occurs too slowly to be practical. Crystallization should be effected carefully in order to obtain well-formed crystals. Experience indicates that as the crystalline structure of the monomer is improved, the polychloroprene formed therefrom becomes more nearly structurally regular. Thus, by irradiating well-formed monomer crystals, polycholorprenes melting at higher temperatures, e.g. 85° C. or above can be prepared. Methods of growing good crystals are discussed in numerous references. See, for example, G. F. Reynolds, "Crystal Growth" in "Physics and Chemistry of the Organic Solid State," edited by D. Fox et al., Interscience Publishers, 1963, vol. 1, and P. W. Bridgman, Proc. Am. Acad. Arts Sci., 60, 303 (1925). A method adapted from the latter reference is particularly satisfactory. In this method the sample to be crystallized is held in a sharply pointed container which is lowered slowly into a bath which is kept at a suitable crystallization temperature. Crystallization is initiated in the area of small volume at the lower tip of the container, and the seed crystal thus formed grows slowly upward as immersion proceeds.

It is not essential that the entire mass of chloroprene monomer which is to be irradiated be crystallized before the radiation treatment. However, only the crystalline monomer will yield the chloropene polymer of the invention. Liquid or glassy monomers can be made to polymerize at radiation doses much greater than those required for polymerization of the crystalline monomer. However, the product obtained from the glassy or liquid monomer is quite different in nature from that obtained by irradiating the crystalline monomer; that is, it is rubbery, and does not have the desirable resistance to spontaneous discoloration and HCl formation on aging characteristic of the product which is the subject of this invention. In addition, the product obtained from irradiating the glassy monomer, which forms at temperatures below —180° C., is largely insoluble even after heating in common solvents for polychloroprene. The high polymer obtained from polymerizing liquid monomer is also partly insoluble in the same solvents.

Irradiation is carried out using conventional techniques. The radiation suitable for use in the present invention is of the type usually designated "high energy radiation" or "ionizing radiation." It includes high energy electrons, photons, protons, alpha particles and neutrons. For a discussion of various methods for producing these types of radiation see U.S. Pats. 3,012,950 to Anderson and 3,261,804 to Graham. For general references see Spinks and Woods, An Introduction to Radiation Chemistry, John Wiley & Sons, 1964, and Charlesby, Atomic Radiation and Polymers, Pergamon Press, 1960.

The total radiation dose to which the monomer is exposed should not exceed about $10^7$ rads, a rad being defined as 100 ergs of ionizing energy per gram of the irradiated monomer. The lower limit is determined by the yield of polymer desired. It has been found that defects in the monomer crystals increase the radiation dose required to obtain a given yield of polymer. Possible defects include co-crystallizable impurities which will not copolymerize but which will terminate a polymer chain, lattice defects, and other polymerization-inhibiting structures. Generally, a total dose of about $7.5 \times 10^4$ rads is the minimum to provide a high enough yield of polymer to be practical. In general, a total dose in excess of $10^7$ rads should be avoided in order to avoid cross-linking and obtain a benzene-soluble polymer and further in order not to contaminate the polymer with product obtained by polymerization of the uncrystallized monomer.

The dose rate will depend on the length of time during which the monomer can be practically irradiated to obtain a given yield. A satisfactory range is about $2.5 \times 10^4 – 4 \times 10^4$ rads per minute. When electron radiation is used, substantially higher dose rates than this should be avoided because of the heat which is generated in the crystals. X-ray, gamma ray, and neutron type radiation are preferred because of their high penetrating power and also because these forms of radiation do not generate significant heat in the crystalline monomer.

There is no need to operate under an inert atmosphere or to take special precautions to exclude atmospheric water vapor.

After the irradiation process, the reaction mass is allowed to warm to room temperature, and unreacted liquid monomer is removed from the polymer. To remove the residual monomer the polymer is soaked in and subsequently washed with several portions of a suitable solvent such as methanol, or acetone, and dried. The time required for unreacted monomer removal can be reduced by breaking the reaction mass up into finely divided particles with a device such as a rotary blendor or other suitable shredding machine.

The invention will be further illustrated by reference to the examples which follow wherein parts are by weight unless otherwise indicated.

Example 1

(A) A 40-gram sample of chloroprene is placed in a test tube and is suspended in a Dewar flask containing liquid nitrogen in the bottom. The tube is suspended above the liquid nitrogen and is cooled by nitrogen vapor in such a manner that the lower portion of the monomer in the tube is maintained at a temperature not lower than −155° C. and the upper portion at a temperature of about −130° C. After about 5 hours, about half of the chloroprene (in the lower portion of the tube) has crystallized. The whole sample is then cooled to −196° C. The uncrystallized chloroprene becomes glassy. The sample is then transferred to a liquid nitrogen bath and is irradiated at −196° C. with X-rays in a Van de Graaff accelerator at a dose rate of 40,000 rads/minute for 30 minutes, leading to a total dose of $1.2 \times 10^6$ rads.

The polymer formed is warmed to room temperature, washed with acetone, filtered through cheesecloth, and dried overnight in a vacuum oven at 55° C. 5.4 grams of polymer is obtained which has a melting point of 86° C. and a glass transition temperature of −47° C.±2° C. (measured by differential thermal analysis on a melted and quenched sample). Infrared spectra indicate that the product consists entirely of trans-1,4-units. The polymer is 45% soluble in benzene. The soluble portion has an inherent viscosity in benzene (0.045 g./100 ml. at 30° C.) of 0.81.

(B) For comparison, an aliquot of the same sample of chloroprene as used in the first part of the experiment is placed directly in liquid nitrogen at −196° C. It is seen to crack, indicative of a glassy organic liquid in a sharp thermal gradient. This sample gives no solid polymer when irradiated in the same way as described in Section A above. This illustrates the importance of having the chloroprene in the crystalline form in order to obtain the polymer of this invention.

Example 2

(A) A sample of 23 g. of chloroprene is crystallized by first cooling in liquid nitrogen (about −195° C.) followed by heating to about −130° and crystallizing under conditions of controlled thermal gradient by slow immersion (one inch per hour) in a pointed-bottom Pyrex test tube into a bath held at about −145° C. (This is the Bridgman method for the crystallization of liquids.) The mixture of the crystalilzed and uncrystallized chloroprene is then irradiated, in the test tube in which it was crystallized, in the electron beam of a resonant transformer at −140° C. to −150° C. The total dose is estimated to be about $5 \times 10^6$ rads.

The irradiated sample is allowed to warm to room temperature. The liquid unpolymerized monomer is decanted from the swollen polymer. The latter is washed several times with 100-ml. portions of methanol containing 1-2 percent of an antioxidant [2,2′-methylenebis-(6-tert-butyl-p-cresol)]. The washed product is dried first at room temperature and then in a vacuum oven. The product is a white thermoplastic polymer having a fibrous appearance and is soluble in refluxing benzene. The melting point is 83° C. (determined by differential thermal analysis using a sample that has been dissolved in benzene, precipitated with methanol, and dried). The polymer is shown by nuclear magnetic resonance and infrared spectroscopy to comprise 98%±1% trans-1,4-units in the head-to-tail sequence, with 0.0% cis-1,4-units, 0.0% 1,2-units, and 0.5% 3,4-units.

(B) For comparison, a sample of liquid monomer is irradiated in the electron beam of a resonant transformer as a layer 2 mm. in thickness held in a thin-walled glass dish cooled with and containing some solid carbon dioxide at −79° C. The total dose is calculated to be $2 \times 10^8$ rads, which is a dose greatly in excess of the total dose required to polymerize the crystalline chloroprene in Section A of this example. The product obtained, unlike the product of paragraph A, is a soft rubber and is predominantly insoluble in the common solvents for chloroprene polymers. No melting point is obtained in a different thermal analysis examination even after the polymer had stood at room temperature for several hours. The temperature range covered in the analysis is −40° to +100° C. It is shown by NMR to consist of 82±1% head-to-tail units (cis and trans). The product is stored in a closed container of clear glass in daylight at 25° C. After two months it has a strong odor of HCl and is dark brown in color. In contrast, the product of Section A of this example is odorless and white after a similar period of storage.

Example 3

A 40-ml. sample of freshly distilled chloroprene is exposed to temperatures in the range of −130° C. to −165° C. over a 2-hour period (over cold nitrogen gas). During this period the sample has become predominantly crystalline. The sample is then irradiated in the X-ray beam of a Van de Graaff accelerator at −195° C. for 30 minutes at a dose rate of 40,000 rads/minute.

The polymer is isolated in the same way as in Example 2, Section A. A 19% yield of product is obtained (based on weight of original chloroprene sample) of white, fibrous polymer having an initial melting point of 92° C. (determined by differential thermal analysis). A melting point taken from the sample that has been melted and recrystallized has a melting point of 82° C. The glass transition temperature is about −43° C.

When a sample of chloroprene which has been rendered glassy by being poured directly into liquid nitrogen is irradiated in the same way as the crystalline sample, only a 1.1% yield of polymer is obtained. Polymer formation is probably due to a small amount of crystalline material mixed with the glassy material.

Example 4

A sample of chloroprene monomer is crystallized over cold nitrogen gas at −130° C. to −150° C. over a 3-hour period. Crystallization is initiated by contacting the surface of the monomer mass with the point of a copper needle brazed to a copper tube filled with liquid nitrogen. The crystallized sample is irradiated in a bath of tetrafluoromethane at about −133° C. at a dose rate of 25,000 rads/min. for 30 minutes in a Van de Graaff accelerator. The polymer is isolated as described in Section A of Example 2. An 8% yield of polymer is obtained which is soluble in benzene. It has a melting point of 92° C. and an inherent viscosity (0.1 g. in 100 ml. of benzene) of 1.29. This corresponds to a dilute solution viscosity to be expected for a polymer of molecular weight of the order of $10^5$.

Example 5

An adhesive is prepared in the following way:

To 20 g. of a mixed solvent comprising toluene, hexane, and methyl ethyl ketone (in a 2/1/1 volume ratio) are added the following: 0.02 g. of 2,2′-methylenebis(6-tert.-butyl-p-cresol), 0.04 g. of magnesia, and 0.05 g. of zinc oxide. The mixture is ball-milled for 2 days. To the resulting suspension 5 g. of polymer prepared as described in Example 4 is added, along with 10 g. of toluene, and the polymer is dissolved by warming to reflux. To the resulting solution is added 1.0 g. of phenolformaldehyde resin having a melting point of 66–70° C., a specific gravity of 1.04 and an acid No. of 10–20 (available commercially as "Amberol" ST–137X). The mixture is then stirred under reflux for 4 hours. To the resulting mixture is added a ball-milled dispersion of 0.16 g. of magnesia, 0.20 g. of zinc oxide, 0.08 g. of 2,2′-methylene-bis(6-tert-butyl-p-cresol) in 10 g. of the 2/1/1 (by volume) mixture of toluene, hexane, and methyl ethyl ketone. After standing for 3 days at room temperature the mixture is again stirred under reflux for 4 hours until homogeneous. The volatile solvent components are then evaporated, and the remaining solids are ground to a powder in a mortar containing solid carbon dioxide. A second sample of a powdered adhesive is prepared in the same way except that the polychloroprene component used is a conventional polymer prepared by polymerizing chloroprene in aqueous emulsion at a temperature below 0° C. using a Redox catalyst system.

The adhesives prepared are tested by using them to bond together strips of a synthetic shoe soling material ("Neolite"). A sufficient amount of each powdered adhesive composition is sprinkled between two strips of the substrate (each 225 mils thick) so that after pressing at 3000 p.s.i. for 10 minutes at 120° C. an adhesive film 10 mils thick is obtained. The bond strength at 70° C. is determined by pulling the pieces apart at an angle of 180° C. on an "Instron" tensile testing machine at 70° C. after heating the assemblies for 10 minutes at 70° C. Table I shows the bond strengths of the two assemblies.

TABLE I

| Sample: | 70° C. peel strength [1] |
|---|---|
| Prepared from the polymer of this invention | 11.0 |
| Prepared from the conventional chloroprene polymer (control) | 2.0 |

[1] Pounds per linear inch.

What is claimed is:

1. A chloroprene polymer having a melting point of about 80° C. or higher in which at least about 95% of the structural units correspond to the formula:

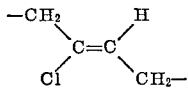

and wherein about 95 to 100% of the 2-chloro-2-buten-1,4-ylene structural units of said polymer are in a head-to-tail sequence.

2. A process for preparing polychloroprenes having melting points at least as high as 80° C. which consists essentially of irradiating solid crystalline chloroprene monomer at a temperature below about −130° C. with high energy radiation using a total dose not exceeding $10^7$ rads.

3. A chloroprene polymer of claim 1 having a melting point of 85° C. or higher.

4. The process of claim 2 wherein the total radiation dose is from about $7.5 \times 10^4$ rads to $10^7$ rads.

5. The process of claim 4 wherein the dose rate is from about $2.5 \times 10^4 - 4 \times 10^4$ rads per minute.

References Cited

UNITED STATES PATENTS 3,012,950  12/1961  Anderson _____ 204—159.22

OTHER REFERENCES

Brandrup et al., Polymer Handbook, Wiley & Sons (1965), p. III–34.

MURRAY TILLMAN, Primary Examiner

R. B. TURER, Assistant Examiner

U.S. Cl. X.R.

161—253; 204—159.22; 260—32.8, 41.5, 845